INVENTORS
MARCEL LEVECQUE
MAURICE CHARPENTIER
BY Albert L. Krey
ATTORNEY

INVENTORS
MARCEL LEVECQUE
MAURICE CHARPENTIER

United States Patent Office 3,179,507
Patented Apr. 20, 1965

3,179,507
APPARATUS FOR THE MANUFACTURE OF FIBERS FROM THERMOPLASTIC MATERIALS SUCH AS GLASS
Marcel Levecque, Saint-Gratien, and Maurice Charpentier, Rantigny, France, assignors to Compagnie de Saint-Gobain, Neuilly-sur-Seine, France, a corporation of France
Filed Feb. 28, 1961, Ser. No. 92,345
Claims priority, application France, Mar. 19, 1960, 821,884, Patent 1,259,592
11 Claims. (Cl. 65—12)

The present invention relates to the manufacture of fibers from mineral or organic materials in the viscous state and in particular glass fibers.

The invention concerns a process according to which the material in the melted state is projected by centrifugal force, in the form of filaments, through orifices provided at the periphery of a centrifuge body rotating at high speed, these filaments being subjected to the action of gas jets which draw them out into fine fibers.

It is the object of the present invention to produce very fine fibers, the diameter of which is less than 2 microns, these fibers being capable of utilization for the manufacture of filtration papers.

According to one feature of the invention, a thermally insulating screen is placed under the rotating body. The presence of this screen has the effect of avoiding the formation of a zone of depression with respect to the surrounding space, under the rotating body, which is due to the action of the high temperature attained by the bottom of the rotating body and in which the fibers, since they are very fine, re-group themselves by agglomeration and even stick together under the rotating body.

According to another feature of the invention, cooling means are associated with the insulating screen. In particular, the invention provides for projecting water under the screen. By vaporizing, this water helps to relieve the low pressure or vacuum under the rotating body.

In one embodiment of the invention, the thermally insulating screen provided under the rotating body is supplied on its lower surface with a double casing into which passes the water which is sprayed under the rotating body and which is transformed into vapor.

The invention also provides for the spraying of water laterally in such a way as to cool the hot gases which have circulated along the peripheral wall of the rotating body. This cooling has the effect of decreasing the volume of these gases and consequently exerting an action which contributes toward decreasing the vacuum under the rotating body.

Figure 1:
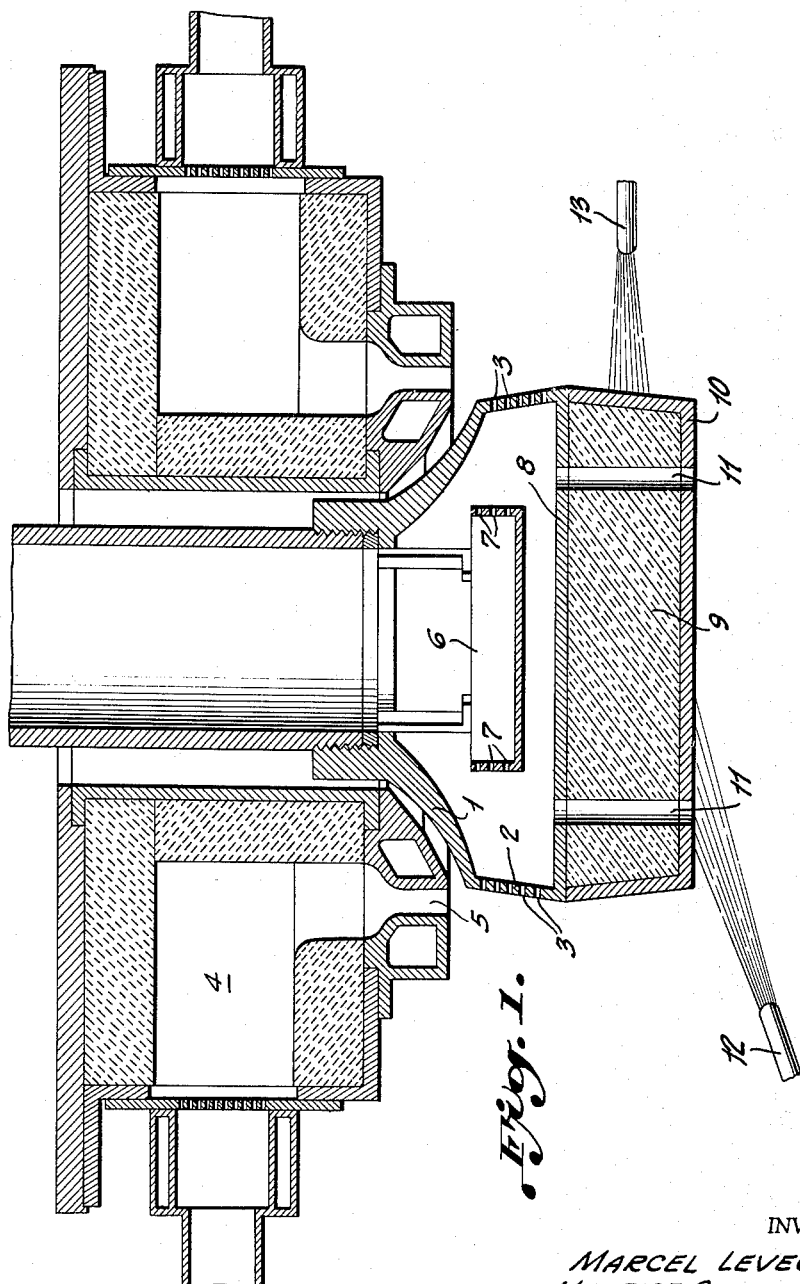
Figure 2:
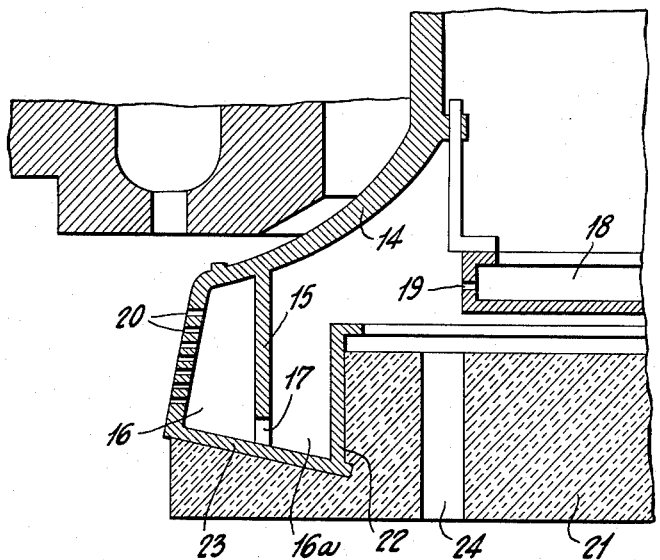
Figure 3:
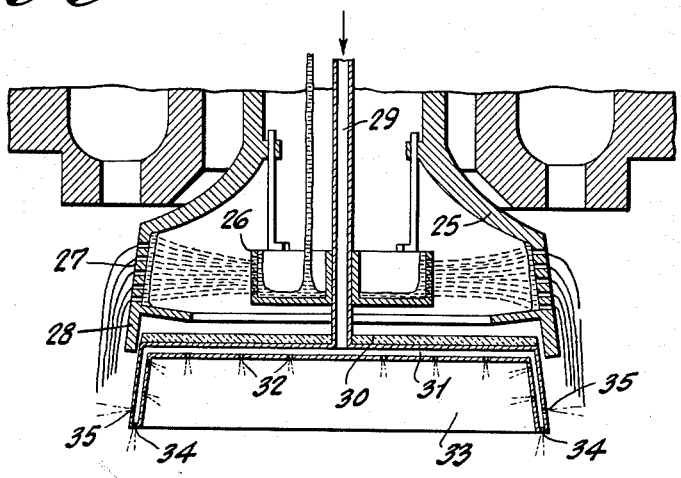

Different devices for realizing the objectives of the invention are described below in conjunction with the accompanying drawing, wherein FIG. 1 is a vertical sectional view of one embodiment of the invention;

FIG. 2 is a partial vertical sectional view of a different embodiment of the centrifuge construction from that shown in FIG. 1; and FIG. 3 is a vertical sectional view of still another embodiment of the invention.

In the embodiment shown in FIG. 1, the centrifuge body 1 is provided, in the known manner, with a peripheral band or wall 2 in which are provided rows of orifices 3. The centrifuge body is rotated at high speed about its axis and the melted material which is fed thereto is projected through the orifices 3 in the form of filaments. As is also known, a combustion chamber 4, of general annular shape, permits combustion gases at high speed and high temperature to be directed through expansion orifice 5, coaxial with the rotating body. These gases come into contact with the filaments of material projected through orifices 3 and cause them to be drawn-out into very fine fibers.

In order to obtain a good distribution of the melted material on the interior face of the peripheral wall or band 2, and consequently an identical supply for all the orifices whatever their level, there is likewise provided a distributor 6 inside the rotary body 1 and fixed thereto. This distributor 6 may assume the shape of a basket provided with orifices 7 in the lateral wall thereof. The molten material is fed to the distributor 6 and is projected through the orifices 7 therein so as to form a layer of substantially uniform thickness over the entire inner surface of the rotating body.

In accordance with the invention, a thermally insulating screen 9 is connected to the bottom 8 of the rotating body and is affixed to this body by casing 10 attached to the bottom. Conduits or passages 11 furnish communication between the inside and outside of the rotating body.

The thermally insulating screen provided under the bottom of the rotating body may be utilized alone or in combination with a spray of water. For example, one or several outlet tubes such as 12, through which jets of water are projected toward the lower surface of the heat screen may be used, the water thus projected being transformed into steam. Outlet tubes such as 13 may also be provided, which project jets of water laterally, under the rotating body, to cool the gases which attenuate or draw out the fibers.

In the variation shown in FIG. 2, the rotating body 14 is provided with a partition 15 concentric to its axis, this partition forming two chambers 16, 16a intercommunicating by means of an opening 17. The molten thermoplastic material is conducted into a container 18 fixed to the rotating body 14. The container 18 is provided with orifices 19 through which the molten material is projected to form a reserve supply thereof in chambers 16, 16a, which assures constant and identical pressure on all projection orifices 20 of the rotating body. The bottom of this rotating body is open.

In accordance with the invention, a heat screen 21 is added under the rotating body, consisting of a suitable insulating material and attached to walls 22, 23. Passages 24 are provided in the screen to assure communication between the inside and outside of the rotating body.

In the embodiment shown in FIG. 3, the rotating body 25 is provided with a distributor device in the form of basket 26 for distributing the melted material onto the inner surface of peripheral wall 27, which is analogous to the arrangement shown in FIG. 1. The bottom of the rotating body is open and the peripheral band extends downward through a portion 28 forming a skirt.

A stationary hollow rod 29 is extended through the axis of the rotating body and serves as support for a plate 30 of thermally insulating material as well as for a double or hollow casing 31 below the centrifuge body 25. The level of plate 30 is such that it is located substantially within skirt 28. The hollow casing 31 communicates with tube 29 and is provided with small orifices 32, through which the water carried by the tube is projected to the interior of space 33 encompassed by the hollow casing, where it is converted to steam. Water projection orifices such as 34 may also be provided on the lower edge of the hollow jacket or casing, and orifices 35 on the outer wall of the hollow casing, to cool the downwardly travelling attenuating gases.

We claim:

1. An apparatus for the production of very fine fibers from viscous thermoplastic material, particularly molten glass, which comprises a centrifuge rotatable about an axis and having a peripheral wall provided with a plurality of superposed rows of orifices therein through which are adapted to be projected filaments by centrifugal force, an annular combustion chamber surrounding said rotary centrifuge and fitted with a blower slot to direct downwardly combustion gases at high temperature and velocity beyond said peripheral wall for attenuating said filaments into thin fibers, a heat-insulating screen below the bottom of said centrifuge, said rotary centrifuge having a base provided with a large circular opening to render the centrifuge substantially bottomless with a downward extension of the peripheral wall to form a skirt below said base, said heat insulating screen being spaced below said base and inwardly of said skirt to permit the passage of the hot gases to the space below the centrifuge, and a cooling casing mounted on the bottom of said heat insulating screen.

2. An apparatus as set forth in claim 1 wherein said heat-insulating screen and cooling casing are mounted integrally and independently of the centrifuge, and a fixed shaft for mounting said screen and casing extending upwardly through said centrifuge.

3. An apparatus as set forth in claim 2 wherein said fixed shaft is hollow and said casing is hollow and pan-shaped having the interior thereof communicating with said hollow shaft, said casing also being provided with openings in the horizontal internal wall thereof remote from said heat-insulating screen for the passage of cooling fluids therethrough.

4. An apparatus as set forth in claim 3 including openings in the inner lateral wall of said pan-shaped casing to relieve the low pressure or vacuum below said casing.

5. An apparatus as set forth in claim 3 including openings in the inner lateral wall of said pan-shaped casing to relieve the low pressure or vacuum below said casing and openings in the outer wall and bottom edge of said casing to cool the space outside of said casing.

6. An apparatus for the production of very fine fibers from viscous thermoplastic material, particularly molten glass, which comprises a centrifuge rotatable about an axis and having a peripheral wall provided with a plurality of superposed rows of orifices therein through which are adapted to be projected filaments by centrifugal force, a rotary distributor within said centrifuge having the discharge areas thereof spaced a substantial distance from said peripheral wall to receive a supply of the thermoplastic material from above and discharge the same laterally and uniformly onto the inner face of said peripheral wall, said centrifuge having a plurality of openings in the base thereof for the passage of the hot gases from the interior to the exterior of the centrifuge, an annular combustion chamber surrounding said rotary centrifuge and fitted with a blower slot to direct downwardly combustion gases at high temperature and velocity beyond said peripheral wall for attenuating said filaments into thin fibers, and a jacketed insulating screen affixed to the bottom of said centrifuge and provided with passages coinciding with the openings in the base of the centrifuge.

7. An apparatus as set forth in claim 6 including means for spraying cooling liquid against the base of said jacketed insulating screen.

8. An apparatus as set forth in claim 6 including means for spraying cooling liquid against the external wall of said jacketed insulating screen.

9. An apparatus for the production of very fine fibers from viscous thermoplastic material, particularly molten glass, which comprises a centrifuge rotatable about an axis and having a peripheral wall provided with a plurality of superposed rows of orifices therein through which are adapted to be projected filaments by centrifugal force, an annular combustion chamber surrounding said rotary centrifuge and fitted with an annularly-shaped blower slot disposed transversely to the planes of projection of said filaments and immediately beyond said peripheral wall to directly downwardly combustion gases at high temperature and velocity beyond said peripheral wall for attenuating said filaments into thin fibers, and a heat insulating screen of a thickness of at least half the height of said wall, said screen being disposed below the bottom of the centrifuge extending substantially under the whole surface thereof and in close proximity therewith for cooling the space therebelow, to prevent the agglomeration of the fibers below said centrifuge after their attenuation.

10. An apparatus for the production of very fine fibers from viscous thermoplastic material, particularly molten glass, which comprises a centrifuge rotatable about an axis and having a peripheral wall provided with a plurality of superposed rows of orifices therein through which are adapted to be projected filaments by centrifugal force, a rotary distributor within said centrifuge having the discharge areas thereof spaced a substantial distance from said peripheral wall to receive a supply of the thermoplastic material from above and discharge the same laterally and uniformly onto the inner face of said peripheral wall, said centrifuge having at least one opening in the base thereof for the passage of the hot gases from the interior to the exterior of the centrifuge, an annular combustion chamber surrounding said rotary centrifuge and fitted with an annularly-shaped blower slot immediately beyond said peripheral wall to direct downwardly combustion gases at high temperature and velocity transversely to the planes of projection of said filaments for attenuating said filaments into thin fibers of less than 2 microns in diameter, and a heat-insulating screen below the bottom of said centrifuge of a thickness of at least half of the height of said wall and extending substantially under the whole surface thereof and in close proximity therewith for cooling the space therebelow, to prevent the agglomeration of the fibers below said centrifuge after their attenuation, said screen having at least one passage therein for the hot gases issuing from the interior of the centrifuge.

11. An apparatus as set forth in claim 9 wherein the base of the centrifuge is provided with a plurality of circular openings and the heat-insulating screen is provided with corresponding openings in alignment therewith.

References Cited in the file of this patent

UNITED STATES PATENTS

| | | |
|---|---|---|
| 2,609,566 | Slayter et al. | Sept. 9, 1952 |
| 2,855,626 | Firnhaber | Oct. 14, 1958 |

FOREIGN PATENTS

| | | |
|---|---|---|
| 1,124,489 | France | Oct. 11, 1956 |
| 1,154,476 | France | Apr. 10, 1958 |
| 1,174,893 | France | Mar. 17, 1959 |
| 233,936 | Australia | June 11, 1959 |